United States Patent [19]

Huang

[11] Patent Number: 5,460,254

[45] Date of Patent: Oct. 24, 1995

[54] FREEHUB

[76] Inventor: Jung Y. Huang, Suite 1, 11F. No. 95-8 Chang Ping Rd. Sec. 1, Taichung, Taiwan

[21] Appl. No.: 201,786

[22] Filed: Feb. 9, 1994

[51] Int. Cl.$^6$ .................................................. F16D 41/24
[52] U.S. Cl. .......................... 192/64; 192/46; 301/110.5
[58] Field of Search .......................... 192/64, 46, 110 B; 301/105.1, 110.5

[56] References Cited

U.S. PATENT DOCUMENTS

| | | | |
|---|---|---|---|
| 2,226,247 | 12/1940 | Lesage | 192/64 |
| 2,489,934 | 11/1949 | Schwinn | 192/64 |
| 4,580,670 | 4/1986 | Nagano | 192/64 |
| 4,674,617 | 6/1987 | Nagano | 192/64 X |
| 4,702,486 | 10/1987 | Tsuchie | 192/64 X |

FOREIGN PATENT DOCUMENTS

| | | | |
|---|---|---|---|
| 458068 | 6/1950 | Italy | 192/64 |
| 398145 | 12/1933 | United Kingdom | 192/64 |
| 439839 | 12/1935 | United Kingdom | 192/64 |
| 498936 | 1/1939 | United Kingdom | 192/64 |
| 2127113 | 4/1984 | United Kingdom | 192/64 |

Primary Examiner—Richard M. Lorence

[57] ABSTRACT

The present invention relates to a bicycle freehub having a hub body, an axle and a sprocket coupling. The axle is coaxially disposed in the hub body which has a spindle, two flanges and two ring ends. One of the ring ends has a receiving cavity and the other ring end has a bearing receiving recess. The receiving cavity provides a ratchet ring which has an outer rim and a plurality of ratchets provided along its inner circumference. The sprocket coupling has a cylindrical pawl driver at one end. The pawl driver further provides at least two recesses on its circumference for retaining two pawls thereon respectively and an annular groove along its outer periphery for receiving a coil spring to hold the two pawls in position. The sprocket coupling is connected with the hub body by inserting the pawl driver into the receiving cavity coaxially, thus the pawls are engaged with the ratchets for enabling said sprocket coupling to drive the hub body in a direction but is free to rotate in the other direction. A sprocket bearing is held between the sprocket coupling and the ratchet ring. Accordingly, the ratchets of the ratchet ring are more close to the central portion of the hub body than the conventional, so that it reduces the distance of transmitting force and eliminates the damaging shearing force and torque.

13 Claims, 3 Drawing Sheets

FREEHUB

BACKGROUND OF THE PRESENT INVENTION

The present invention relates to a bicycle hub, and more particularly to a bicycle freehub which can lessen the strong shearing force and torque generated during transmission.

In the known technology of the prior art, the structural elements of a bicycle include a main frame, steering fork, saddle, two wheels and pedals, freewheel, chain, sprocket, and a front and a rear hubs, etc. Human power for driving the bicycle is transmitted through the pedals, chain, sprocket assembly and hubs to the wheels. The front and rear hubs must be made sturdy enough to support the load and absorb any strong vibration and impact during riding.

As shown in FIG. 1, a traditional bicycle rear hub comprises a hub body 200, an axle 300, a sprocket assembly 100, two ball retainers 310, 320, a freewheel 105, a support bearing 130 and two lock cones 330, 340. The axle 300 is coaxially disposed in the hub body 200 which is supported by the two ball retainers 310, 320 on the axle 300. The front part of the sprocket assembly 100 forms into at least one sprocket 103 and the rear end has a connecting ring 120 with a threaded inner wall for connecting the sprocket assembly 100 to an end of the hub body 200. The freewheel 105 is connected to the inner wall of the sprocket assembly 100 and co-ordinates with the support bearing 130 to connect the sprocket assembly 100 to the axle 300 for rotation. At least one ratchet device 110 is installed between the inner wall of the sprocket assembly 100 and outside of the freewheel 105 for providing one-way train drive of a fixed direction and driveless reverse rotation.

Such traditional rear hub of the bicycle has the following disadvantages:

1. When human power is transmitted from the pedals through the sprocket assembly and hubs to the bicycle wheels, a torque is separated from the central line of the hub body due to the cross-sectional thickness of the sprocket assembly. Thus, the hub body and axle are subject to such torque and sheering force exerted through the sprocket assembly. When the ride is rough and exertion of force become uneven, the steel balls in the ball bearings are unevenly compressed and thus easily damaged with time.
2. Because the freewheel is connected to the chain wheel and takes up most of the length of the cross-sectional thickness of the sprocket assembly, a connection sheath is used to connect the sprocket assembly to one side of the hub body. The connection sheath is therefore subject to tremendous torque and possible to break off suddenly when the bicycle is in use resulting in great danger to the cyclist.
3. Because the sprocket assembly is subject to strong shearing force and rubbing against the freewheel, a gap is developed between the sprocket assembly mid freewheel and makes the sprocket assembly sway when the bicycle is in motion. The sway of the sprocket assembly thus exerts a torque on the hub body mid cause the wheels to wobble resulting in deformation or breakage of the wheel.
4. Because the sprocket assembly is apart from the central line of the hub body mid the whole transmission is supported on the two ends of the axle, the ball bearings which are closest to the sprocket assembly are most susceptible and have the shortest life of use.

The present invention of a bicycle freehub provides an improved bicycle freehub that avoids the strong shearing force and torque generated by prior rear hub assembly and achieves the advantages described above.

SUMMARY OF THE PRESENT INVENTION

The main object of the present invention is to provide a bicycle freehub which avoids the strong shearing force mid torque generated during transmission.

The freehub of the present invention has the following major features:

1. The traditional design of a separate freewheel is eliminated, making the functional position of the sprocket assembly closer to the median line of the hub body thus eliminating the torque that causes damage to the elements in the traditional rear hub.
2. The bearing means between the hub body and axle is moved closer to the rim of the freehub, making more even the weight distribution of the freehub and also providing three sets of bearing means for taking the force when the freehub is engaged in reverse driveless rotation.
3. A movable ratchet is used for facilitation heat treatment for use of aluminum alloy for the freehub.

A preferred embodiment of the present invention of a freehub of a bicycle is described with reference to the following diagrammatic illustrations.

DETAILED DESCRIPTION OF THE PREFERRED EMBODIMENT

Figure 1:
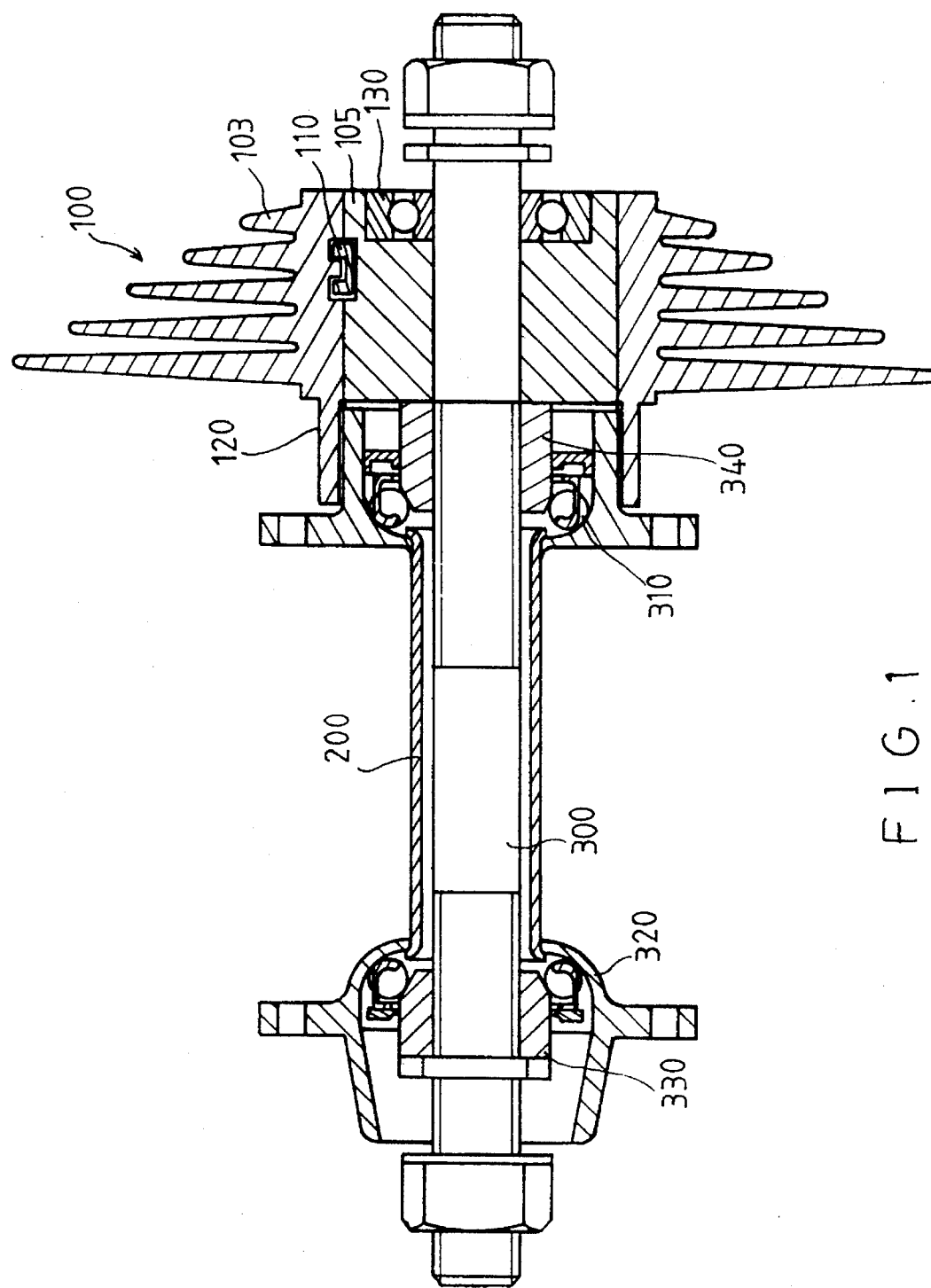
FIG. 1 is a sectional view of a conventional rear hub.
Figure 2:
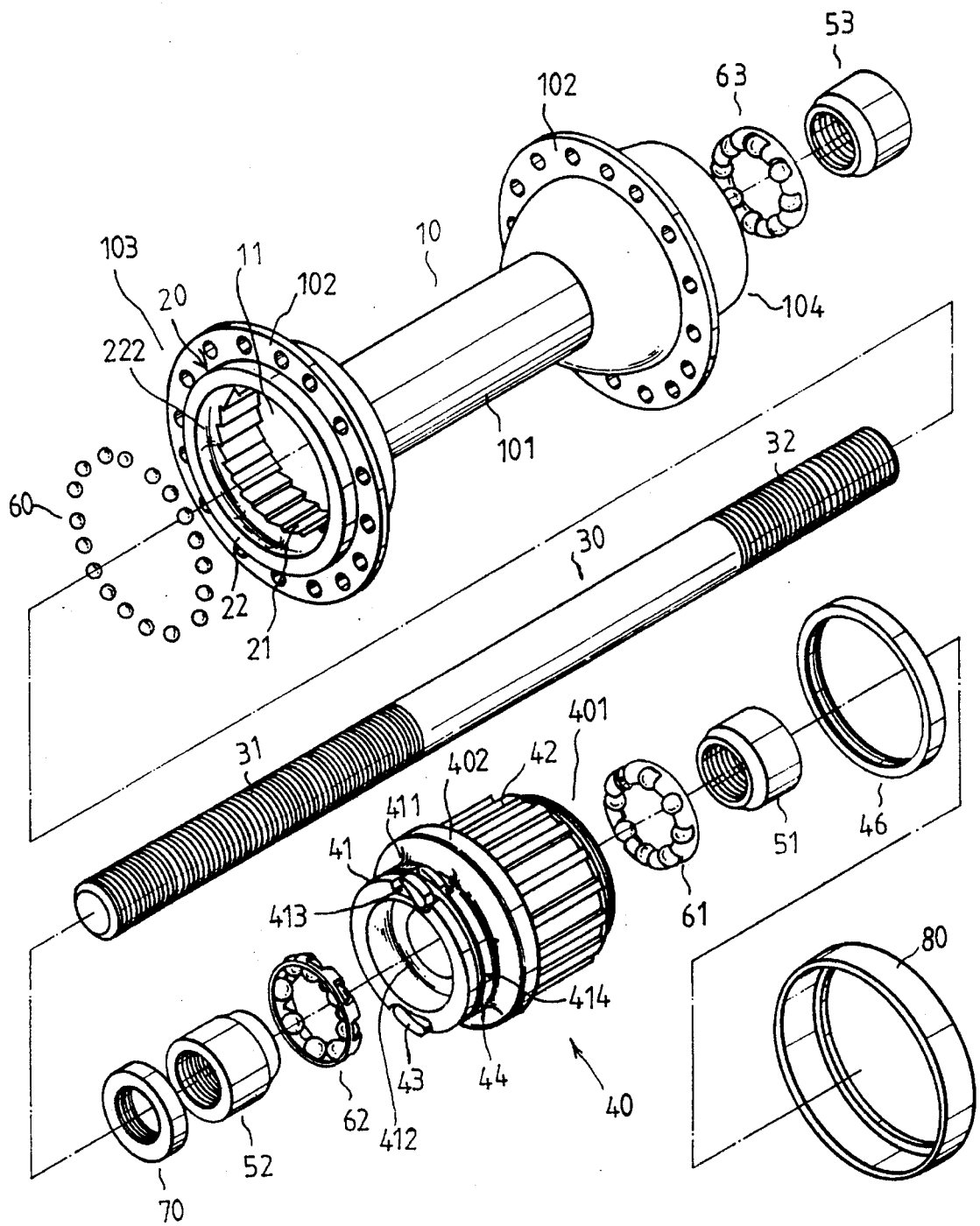
FIG. 2 is an analytical illustration of the elements of a bicycle freehub of a preferred embodiment of the present invention.
Figure 3:
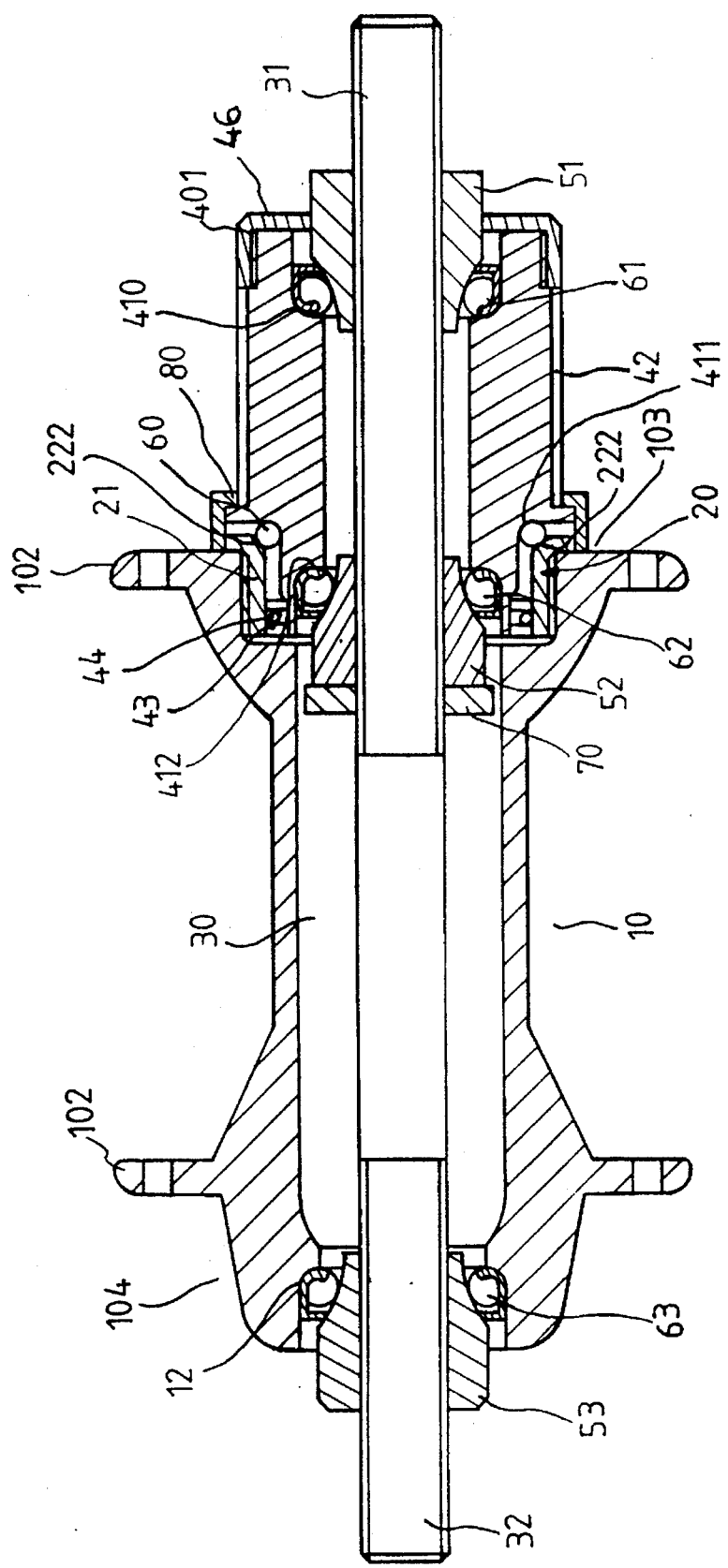
FIG. 3 is a longitudinal sectional view of the above embodiment of the present invention.

Referring to FIG. 2 and 3, the present invention provides a bicycle freehub which comprises a hollow cylindrical hub body 10, an axle 30, a sprocket coupling 40, and a locking means.

The axle 30 has two threaded portions 31, 32 of predetermined length at its two ends and is coaxially disposed in the hub body 10.

The cylindrical hub body 10 comprises a spindle 101, two flanges 102 and two ring ends 103, 104, in which the first ring end 103 has a receiving cavity 11 and the second ring end 104 has a bearing receiving recess 12. The receiving cavity 11 provides a ratchet ring 20 which is firmly set in the receiving cavity 11. The ratchet ring 20 has ratchets 21 provided along its inner circumference and an outer rim 22 which defines a ratchet recessed race 222 along the edge periphery of the rim 22. According to the present embodiment, the outer rim 22 is extended from one end of the ratchet ring 20 perpendicularly and nestled against the outer surface of the first ring end 103 after being embedded in the receiving cavity 11.

The sprocket coupling 40 is a hollow cylindrical shell which has a threaded portion 401 at a first end, a cylindrical pawl driver 41 at the other end, a predetermined number of splines 42 provided longitudinally on its outer circumference for engaging with driving sprockets (not shown), and a retainer rim 402 with predetermined width and the largest outer diameter being defined between the spines 42 and the pawl driver 41. A sprocket recessed race 411 is defined along the exterior tuner peripheral of the pawl driver 41. A first and a second end recessed races 410,412 are defined along the two interior inner periphery of the two ends of the sprocket coupling 40 respectively. The pawl driver 41 further provides at least two pawl recesses 413 on its circumference for retaining two pawls 43 thereon and an elastic means which comprises an annular groove 414 along the outer periphery of the pawl driver 41 for receiving a coil spring 44 to hold the two pawls 43 in position.

The sprocket coupling 40 is connected with the hub body 10 by inserting the pawl driver 41 into the receiving cavity 11 coaxially. Thus the pawls 43 are engaged with the ratchets 21 for enabling the sprocket coupling 40 to drive the hub body 10 in a direction but being free to rotate in the other direction. A sprocket bearing means 60, such as a ball retainer or a plurality of steel balls according to the present embodiment, is held between the ratchet recessed race 222 and the sprocket bearing recessed race 411.

The locking means comprises three cones 51, 52, 53 each forming a recessed race at one end. The cones 51, 53 are screwed to the two threaded portions 31, 32 of the axle 30 respectively. The cone 52, which is secured in position by a lock nut 70 on the axle 30, is screwed to the threaded portion 31 according to the present invention, or formed with the axle 30 in one piece. In which the cones 51, 52 are opposed to lock the sprocket coupling 40 in position and the cone 53 is used to lock the hub body 10 and the sprocket coupling 40 firmly together. Three bearing means 63, 61, 62, such as ball retainer according to the present embodiment or bearing, are held on the bearing receiving recess 12, the first and the second end recessed races 410, 412 by the recessed races of the three cones 51, 52, 53 respectively.

A cap 46 is screwed to the threaded portion of the sprocket coupling 40 in order to secure the driving sprockets in position. A dust cover 80 is mounted to the retainer rim 402 to prevent dust incoming.

Accordingly, the ratchets 21 of the ratchet ring 20 are more close to the central portion of the hub body 10 than the conventional, so that it reduces the distance of transmitting force and eliminates the damaging shearing force and torque. Moreover, three bearing means 60, 61, 62 are utilized to support the sprocket coupling 40 plus the bearing means 63, thus the freehub is more evenly and strongly supported to overcome vibration shock, achieve more even weight distribution and prevent deformation.

I claim:

1. A freehub, comprising a hollow cylindrical hub body, an axle, a sprocket coupling, and a locking means;

said axle being coaxially disposed in said hub body;

said cylindrical hub body having a spindle, two flanges and two ring ends, in which said first ring end has a receiving cavity and said second ring end has a bearing receiving recess, said receiving cavity providing a ratchet ring which has a plurality of ratchets provided along its inner circumference;

said sprocket coupling which is a hollow cylindrical shell having a cylindrical pawl driver at one end, a predetermined number of splines provided longitudinally on its outer circumference, and a retainer rim, with predetermined width and the largest outer diameter, defined between said splines and said pawl driver; said pawl driver further providing at least two pawl recesses on its circumference for retaining two pawls thereon and an elastic means for holding said two pawls in position;

said sprocket coupling being connected with said hub body by inserting said pawl driver into said receiving cavity coaxially, thus said pawls being engaged with said ratchets for enabling said sprocket coupling to drive said hub body in a direction but being free to rotate in the other direction, a sprocket bearing means being held between said sprocket coupling and said ratchet ring; and said locking means for connecting said sprocket coupling to said hub body by securing both said sprocket coupling and said hub body to said axle coaxially and enabling said sprocket coupling and said hub body to rotate about said axle.

2. A freehub as recited in claim 1, wherein said ratchet ring further provides an outer rim which defines a ratchet recessed race along the edge periphery of said rim.

3. A freehub as recited in claim 2, wherein said ratchet ring is firmly set in said receiving cavity and said rim is extended from one end of said ratchet ring perpendicularly and nestled against the outer surface of said first ring end after being embedded in said receiving cavity.

4. A freehub as recited in claim 2, whereto said pawl driver of said sprocket coupling defines a sprocket recessed race along its exterior inner periphery for holding a sprocket bearing means between said ratchet recessed race of said ratchet ring and said sprocket recessed race of said sprocket coupling.

5. A freehub as recited in claim 4, wherein said sprocket bearing means comprises a plurality of balls.

6. A freehub as recited in claim 1, wherein said sprocket coupling further defines two end recessed races along the two interior inner periphery of the two ends of said sprocket coupling respectively.

7. A freehub as recited in claim 6, wherein said axle has two threaded portions of predetermined length at its two ends respectively and said locking means comprises three cones each forming a recessed race at one end, said first mid second cones are screwed to the ends of said two threaded portions of said axle respectively and said third cone being provided between said first and second cones on said axle, in which said third cone and said first cone are opposed to lock said sprocket coupling in position and said second cone is used to lock said hub body and said sprocket coupling firmly together.

8. A freehub as recited in claim 7, wherein said locking means further comprises free bearing means being held on said bearing receiving recess, said first and second end recessed races by said three cones respectively.

9. A freehub as recited in claim 8, wherein said three bearing memos are three ball retainers.

10. A freehub as recited in claim 8, wherein said second cones is also screwed to said axle, and further comprises a lock nut which is screwed to said axle to secure said second cone and said opposing first cone in position.

11. A freehub as recited in claim 1, further comprises a cap and said sprocket coupling further has a thread portion provided at its other end for screwing said cap.

12. A freehub as recited in claim 1, further comprises a dust cover which is mounted to said retainer rim to prevent dust incoming.

13. A freehub as recited in claim 1, wherein said elastic means comprises an annular groove along the outer periphery of said pawl driver for receiving a coil spring to hold said two pawls in position.

* * * * *